United States Patent [19]
Steurer

[11] 3,752,030
[45] Aug. 14, 1973

[54] SCREW
[76] Inventor: Frank V. Steurer, 12 Interstate Rd., Addison, Ill. 60101
[22] Filed: July 29, 1971
[21] Appl. No.: 167,419

Related U.S. Application Data
[63] Continuation-in-part of Ser. No. 81,675, Oct. 15, 1970, abandoned.

[52] U.S. Cl. .................................................. 85/46
[51] Int. Cl. ............................................ F16b 25/00
[58] Field of Search ...................... 85/41, 46, 47, 48

[56] References Cited
UNITED STATES PATENTS
2,167,559  7/1939  Upson .................................... 85/46
1,980,093  11/1934  Rosenberg .............................. 85/46
2,382,019  8/1945  Miller ..................................... 85/41
1,526,182  2/1925  Rosenberg .............................. 85/46

Primary Examiner—Edward C. Allen
Attorney—Elmer L. Zwickel

[57] ABSTRACT

A threaded fastener for securing sheet materials using self tapping techniques to cause continuous spreading, and compressing of the material surrounding the pilot hole so as to minimize stripping and increase holding power.

2 Claims, 6 Drawing Figures

Patented Aug. 14, 1973 3,752,030
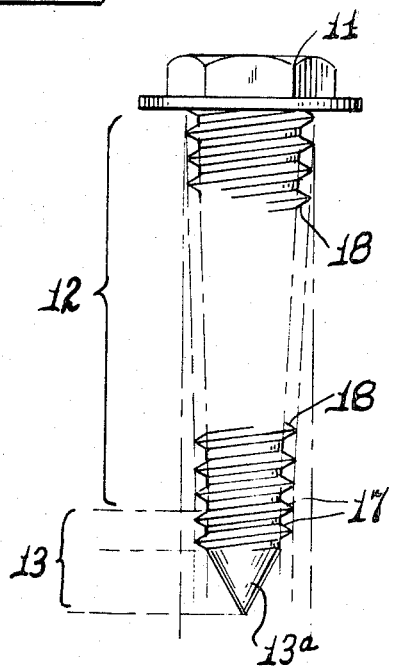
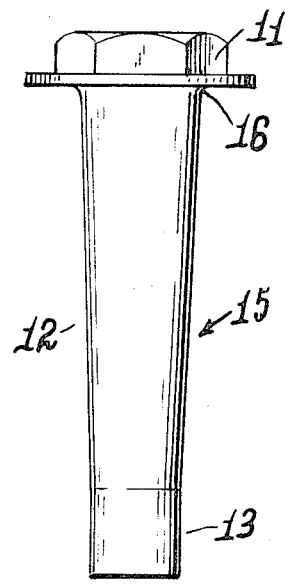
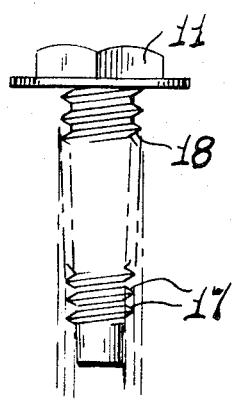
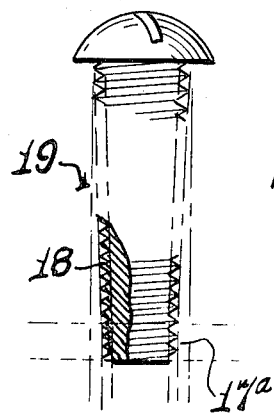
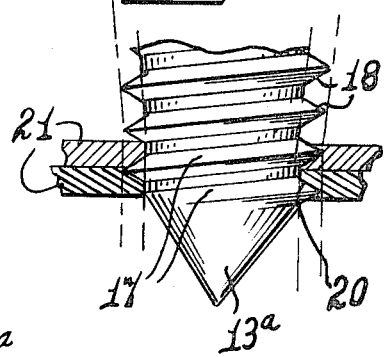
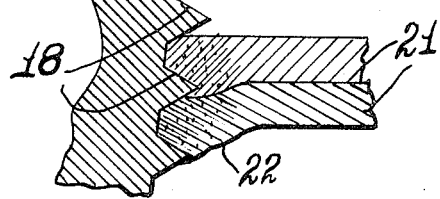

SCREW

This application is a continuation-in-part of my application Ser. No. 81,675, filed Oct. 15, 1970 and now abandoned.

The invention relates generally to improvements in screws, such as sheet metal screws, thread cutting screws, self tapping screws and thread forming screws, to name a few. It is more particularly concerned with a screw for fastening relatively thin stock, such as sheet metal, in which the thread of the screw shank has a controlled taper outwardly which extends from adjacent its entrance end to the under surface of the head. Examples of commonly known screws of this general type are a Type-A screw which has a sharply tapered threaded entrance end; a Type-B screw which has a blunt entrance end, and various types of machine screws with or without thread cutting or tapping means.

In use of sheet metal screws it is usual to provide a clearance or pilot hole in the parts to be secured. The size of the hole varies for different diameter screws, it being of such size as to admit the entrance or lead in end of the screw freely. Thus, because the screws of the present invention have a standard non-tapered thread adjacent its entrance end and threads arranged in a controlled taper over substantially its entire shank, as the screw is driven into the hole the material surrounding the pilot hole is ultimately compressed to increase its hardness, thickness and compactness so as to generate a tight bind on the screw. When the screw of the present invention is machine driven, the driving force or applied torque does not strip the threads formed in the sheet metal. Such stripping has been and still is a serious problem in industry resulting in many product rejects and high production costs. Such failure torque is true with respect to conventional screws having a shank of uniform diameter or tapered uniformly throughout its length and/or wherein the thread fades away at the head.

The instant screw is a decided improvement over conventional screws which may be tapered uniformly throughout their length, but which are devoid of means to prevent binding in or rupture of the material surrounding the pilot hole. It is because of the abrupt taper on a conventional screw which starts at the entrance end, that the sheet material will rupture if soft or bind if hardened. The instant screw is distinguishable from such prior screws in the fact that the present screw has a lead-in point for placement of the screw followed by a threaded section of limited extent that is non-tapered so as not to strain the sheet material. Immediately following this straight section the screw tapers outwardly, very gradually so as to progressively and continuously expand the pilot hole and gradually compress the metal surrounding the hole.

It is therefore an object of the invention to provide a screw of the character referred to.

Another object is to provide a screw that retains a tight grip far beyond the torque holding requirements of a standard screw.

Another object is to provide a sheet metal screw capable of resisting stripping of the threads in the sheet metal when subjected to a torque exceeding standard stripping torque used in industry.

Another object is to provide a sheet metal screw, the diameter of which, at its head end, is about 0.010 inch larger than adjacent to its entrance end.

Another object is to provide a screw having a shank which, at its entrance end, responds substantially to the diameter of a screw of a given size and which, at it's head end responds substantially to that of a next larger size screw.

Another object is to provide a fastener having a full contour thread to continually increase material deformation, work hardening, and final holding power.

Another object is to provide a fastener which has a considerably greater unloosening torque, due to it's inherent wedging action, than current standard screws.

Another object is to provide a fastener which is most advantageous for application in areas of extreme environmental variation, i.e; vibrations, temperature variations, water tightness, pressure variations, without additional washers under fastener head.

Another object is to provide a fastener which creates a solid threaded section in the thickened, work hardened materials, allowing repeated assembly and disassembly of fasteners without stripping; using the same fastener each time.

Another object is to provide a screw of the character referred to which is not difficult or expensive to manufacture, has a high torque resistance to stripping out the hole, and is very efficient in its use.

Other objects and advantages of the invention will become apparent with reference to the following description and accompanying drawings.

In the drawings:

FIG. 1 is a side elevational view, on an enlarged scale, of a Type-A sheet metal screw embodying the invention.

FIG. 2 is a side elevational view of the blank from which the screw is formed.

FIG. 3 is a view of a Type-B screw, embodying the invention.

FIG. 4 is a view of a thread-cutting machine screw embodying the invention.

FIG. 5 is an enlarged view of the screw threads initially engaging in the pilot hole.

FIG. 6 is a detail view of the thread engagement in and displacement of the sheet metal around the pilot hole.

Referring to the exemplary disclosure of the invention as shown in the accompanying drawings, the sheet metal screw shown in FIG. 1 may be of any acceptable size but is here shown in a specific size embodiment, enlarged for purposes of illustration. The screw there illustrated includes a head 11, a threaded tapered shank portion, as bracketed at 12, and a straight entry section, bracketed at 13, including a lead-in point 13a which may or may not also be threaded. The screw illustrated is one-half inch long and its lead in point below the threads is approximately one-eighth inch long. This screw is formed from a blank 15 illustrated in FIG. 2. As there shown, the entry or lead-in section (13) of the blank has a uniform diameter of 0.112 inch, whereas the shank portion 12 is tapered outwardly upwardly from said entry section to the head so as to provide, at the head, a diameter of 0.122 inch. The shank portion will therefore be about ten-thousands of an inch larger at the head end than at its juncture with the entry end. Preferably, a fillet 16 is formed where the shank merges into the head.

When the blank is rolled between conventional thread rolling dies to produce threads thereon, the lead-in point of the blank may be left pointed as shown in FIG. 1, or blunt as shown in FIG. 3, or it may have a standard thread rolled thereon as shown in FIG. 4. In the FIG. 1 and 3 illustrations the inner or upper portion of the straight entry section will have approximately two to two and one-half standard non-tapered screw threads 17 thereon, whereas the remainder of the shank threads (at 12) are tapered.

Referring to FIG. 4 where the threads are shown extending to the lead-in end of the screw, the first two or two and one-half threads 17a thereon are standard non-tapered threads, like the threads 17. The use of standard threads 17–17a lends to gradual screw entrance into the pilot hole without expanding or straining the metal around the pilot hole.

In the exemplary screw illustrated in FIG. 1, the major diameter of the threads 17 is from 0.136 to 0.142 inch, whereas the minor or root diameter of these threads will be from 0.100 to 0.104 inch. The thread 17 or 17a is contiguous with the threads 18 on the shank portion. As shown, the threads 18 have a uniformily progressive diameter enlargement as they approach and reach the head 11. Specifically, in the form illustrated, the thread adjacent the head will have a minor or root diameter of from 0.110 to 0.114 inch and a major diameter of from 0.146 to 0.152 inch. The thread is therefore substantially uniform in height throughout the length of the shank and lead-in end. Further, such uniformity of the thread height produces a core that tapers from about 0.100 inch to 0.110 inch, a variation of about 0.010 inch, plus or minus about 0.002 inch.

It should be apparent that the screw can be inserted in a standard starting or pilot hole slightly larger than its entrance end or lead-in point, and then forcibly rotated so as to cause initial threading of the standard thread 17–17a in the pilot hole and subsequent threading of the tapered thread 18 and resultant expansion of the hole through compression of the material surrounding the hole, as the head end of the shank is approached.

In the thread cutting machine screw 19 illustrated in FIG. 4, as well as in sheet metal and machine screws of sizes and types other than illustrated, the threaded shank thereof increases slightly in diameter leading from the standard straight threaded entrance end as the head end is approached to an amount of approximately 0.010 inch.

In use, as shown in FIGS. 5 and 6, the screw is inserted in an entrance or pilot hole 20 in sheet material 21, which is sized to receive the lead-in point 13a of the screw. This locates the screw and the first two threads 17 can be then engaged in the hole to set up the screw for further entrance. As the screw is further rotated by use of a power tool, the metal surrounding the hole is compressed as the screw is driven home due to the gradual increase in the diameter of the tapered threads 18, that is; the molecules of the metal around the hole are re-arranged so as to strengthen the metal and increase the resistance to stripping. At the same time the material surrounding the hole 20 is displaced slightly out of the plane of the sheets, as indicated at 22 in said figure, to thereby increase the area engaged by the screw. In this manner, and particularly because of metal compression, stripping under standard applied torque of 10 to 11 lbs. is avoided.

In comparative tests using standard sheet metal screws having a uniformily straight shank, and the sheet metal screw of the present invention, it was found in use of 260 standard screws for example, that there were 107 stripped screw holes whereas on an experimental run of 400,000 screws of the type shown in FIG. 1, there was only one screw stripped out utilizing the same torque. In fact, it has been established by test, that the present screw will not strip out even when torqued to about twice the standard screw. Thus it is evident that thread stripping is resisted far beyond present standards. It has further been established that, contrary to use of standard screws, the present screw can be re-inserted in place of a previously applied screw of the same size and will retain its expected holding power.

Although I have described preferred embodiments of my invention, in considerable detail, it will be understood that the description thereof is intended to be illustrative, rather than restrictive, as details of the structure and steps of the method may be modified or changed without departing from the spirit or scope of the invention/ Accordingly, I do not desire to be restricted to the exact construction and steps described.

I claim:

1. A headed threaded fastener for securing sheet and thick materials, said fastener having a threaded lead-in section of uniform major diameter comprised of approximately two to two and one-half threads, a uniform thread having a gradual controlled taper extending from the lead-in section upwardly outwardly to the head, all of said threads extending continuously from the lead-in section to the head and being of uniform height and pitch, and said fastener having a uniform thread cross-section to increase root and total thread contour pressure while fastening material.

2. The fastener recited in claim 1, in which a full thread is present at the head end of the fastener to insure final seating and holding power.

* * * * *